July 26, 1966 E. A. KEDER 3,262,142
METHOD OF PRODUCING A LAST FOR CUSTOM-MADE SHOES
Filed Feb. 26, 1965 4 Sheets-Sheet 1
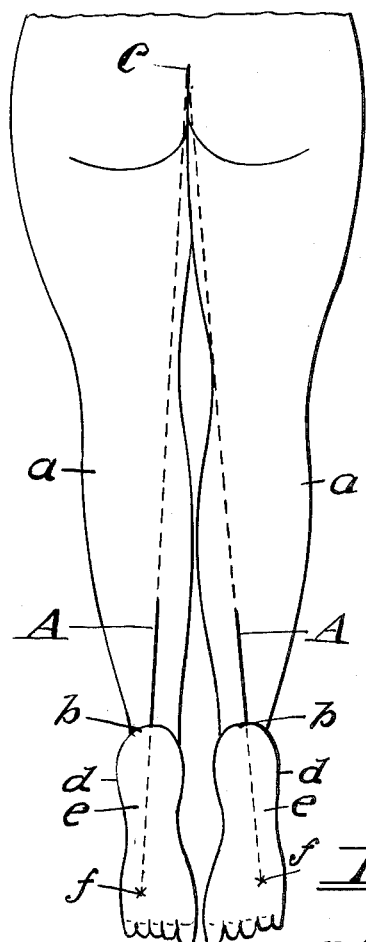
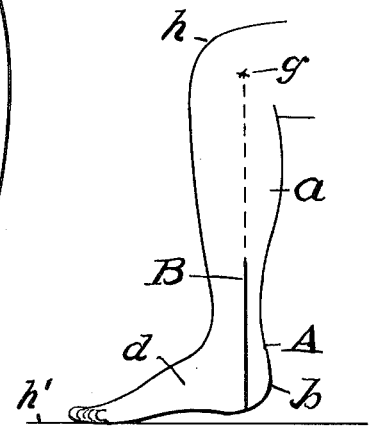
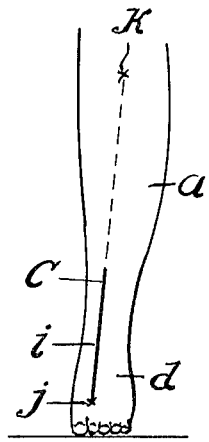
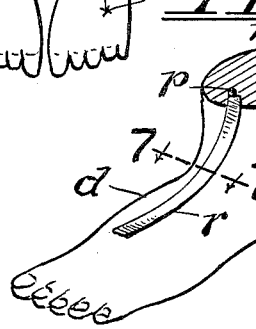
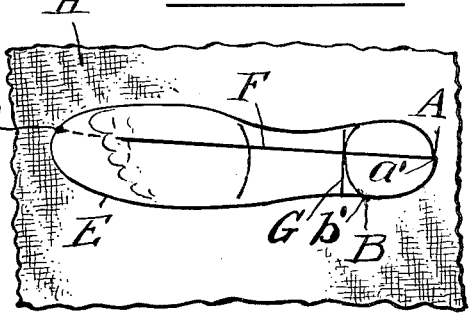
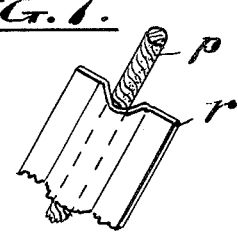
INVENTOR
Ernest A. Keder
BY
ATTORNEY

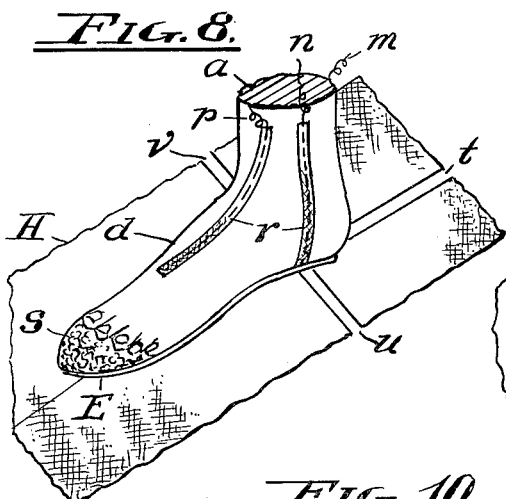
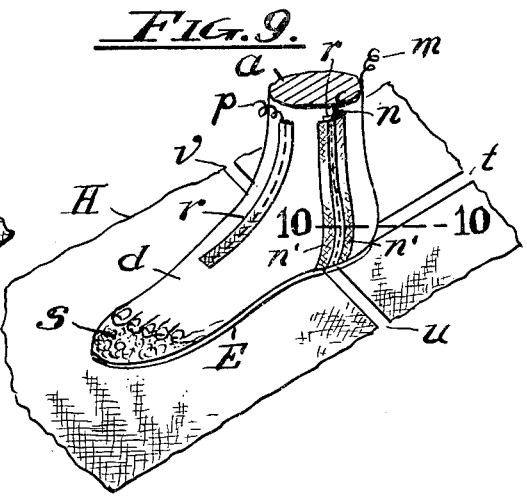
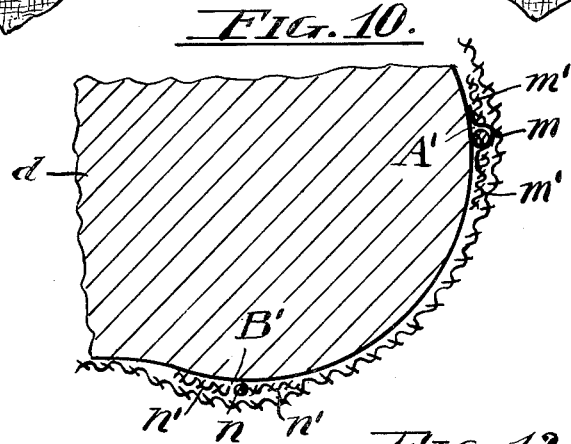
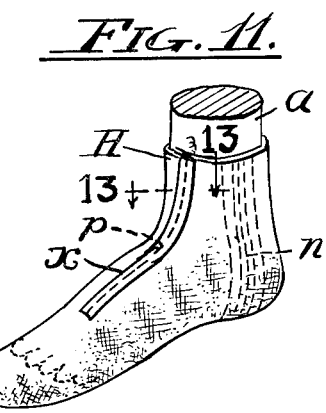
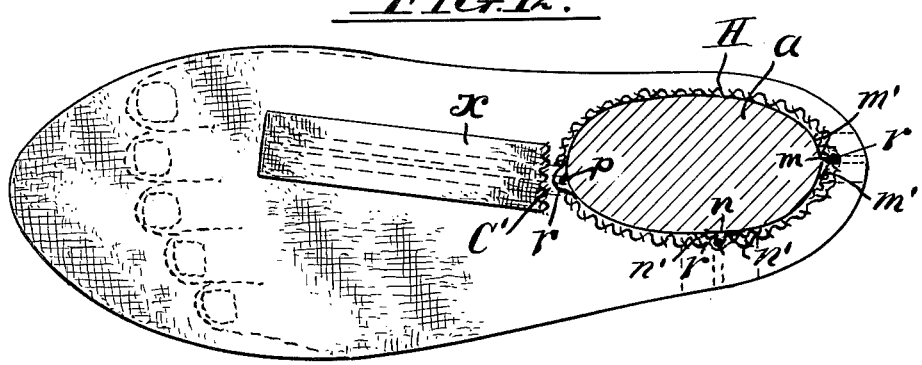
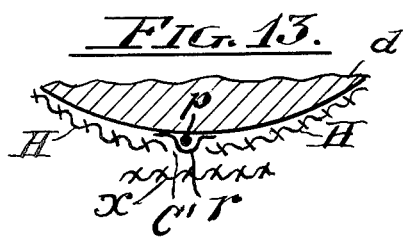

July 26, 1966 E. A. KEDER 3,262,142
METHOD OF PRODUCING A LAST FOR CUSTOM-MADE SHOES
Filed Feb. 26, 1965 4 Sheets-Sheet 3
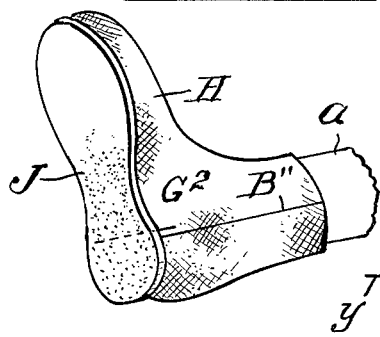
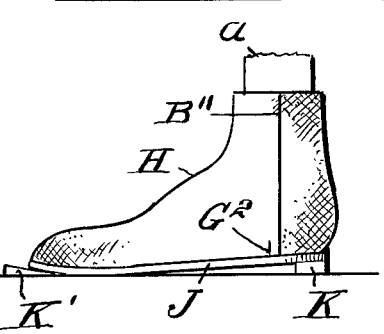
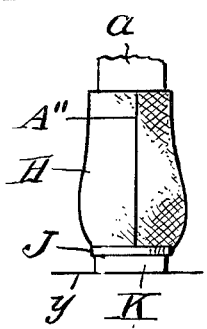
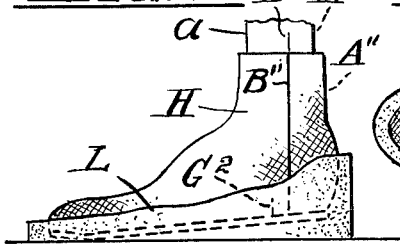
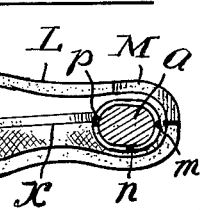
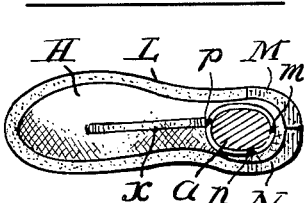
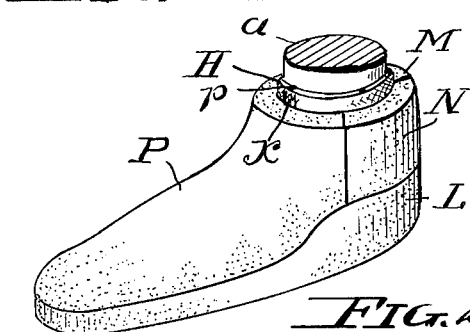
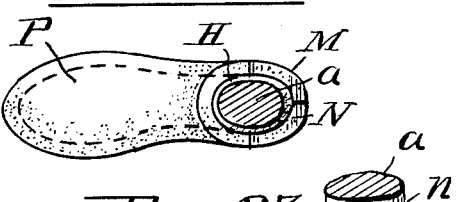
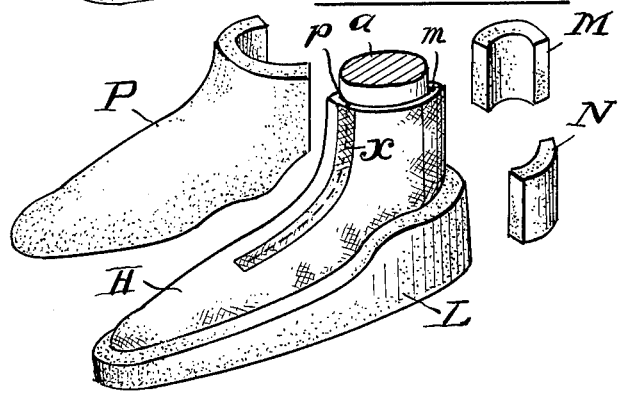
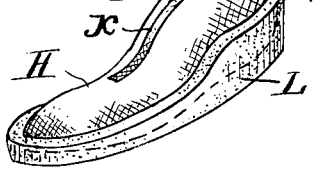
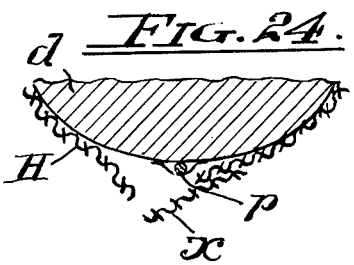

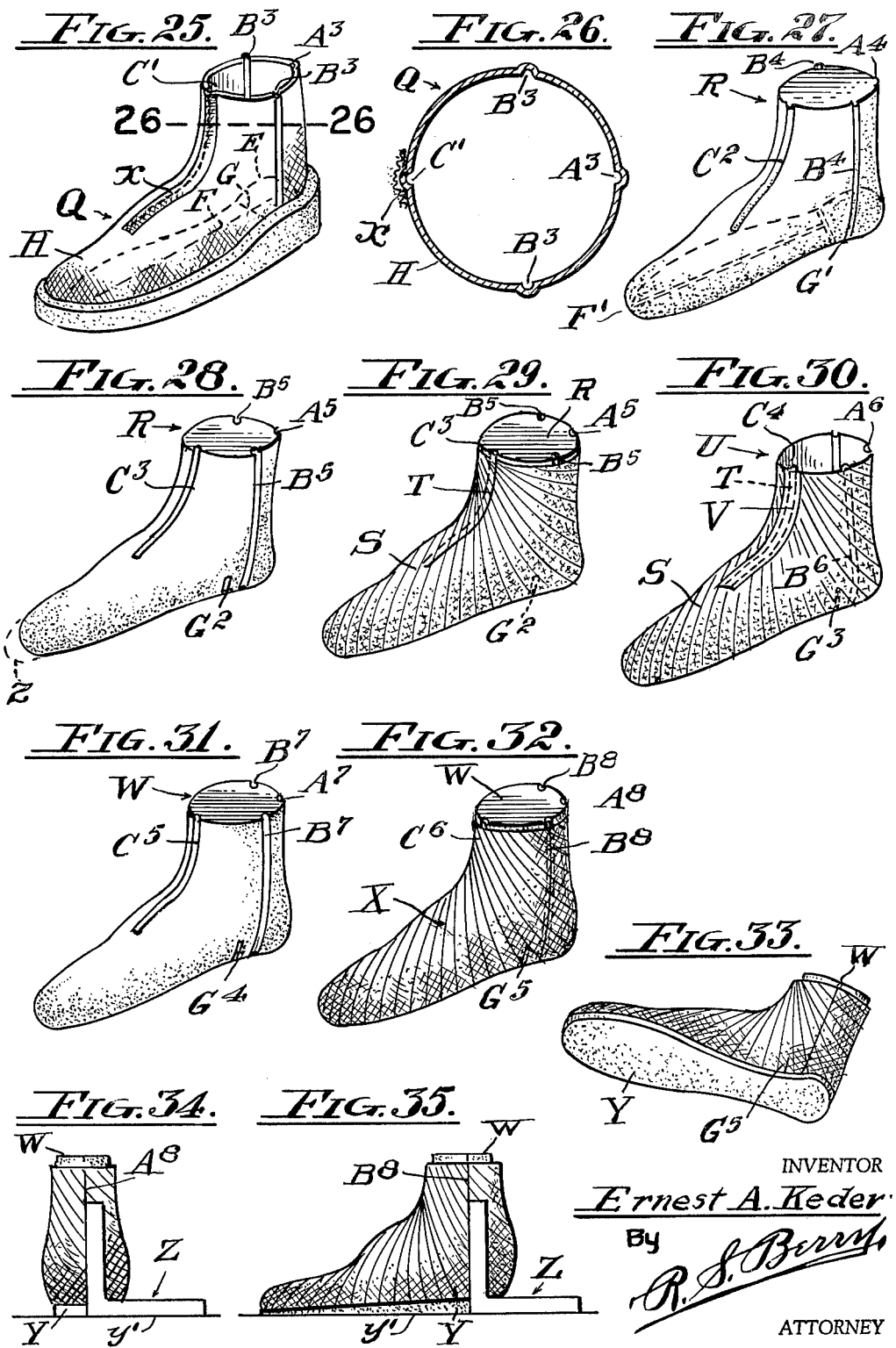

United States Patent Office 3,262,142
Patented July 26, 1966

3,262,142
METHOD OF PRODUCING A LAST FOR
CUSTOM-MADE SHOES
Ernest A. Keder, 159 S. Harvard, Hemet, Calif.
Filed Feb. 26, 1965, Ser. No. 435,443
3 Claims. (Cl. 12—146)

This invention relates to a method of producing a last for custom-made shoes, and has as its primary object the provision of a method whereby a last may be so formed that a shoe fabricated thereon will not only conform to and comfortably fit the foot of the person from which the last was patterned, but will also enable incorporation in the shoe of an element of balance to compensate for a condition of unbalance due to some irregularity or deformity in the person's foot.

Many people are afflicted with some derangement of foot structure which necessitates the use of custom-made or specially constructed shoes, since conventional factory made foot wear is usually unsuitable for use in such cases.

Heretofore, in the fabrication of custom-made shoes, it has been the practice to produce a last patterned on a mold of the person's foot, over which mold an artisan fabricates a shoe, the artisan relying on judgment with some guess-work as to special constructions to be incorporated in the shoe to compensate for abnormalities in the foot defined in the last; such special constructions being provided for the purpose of facilitating use of the feet in standing and in locomotion.

A purpose of the present invention is to provide a method of incorporating in a last, balance denoting means as a guide to the artisan in fabricating a shoe thereon so that the wearer thereof when standing or walking will assume a natural, normal and comfortable balanced posture irrespective of foot irregularity which would preclude such posture with a shoe fabricated to fit the foot without regard to balance.

With the foregoing object and purpose in view together with such other objects and advantages as may subsequently appear, the invention is carried into effect as hereinafter described and claimed and illustrated in the accompanying drawings, in which:

FIG. 1 is a diagram in plan illustrating the manner of delineating balance denoting lines or the backs of the legs and heel portions of the feet of a subject person;

FIG. 2 is a view in side elevation showing the manner of delineating a balance denoting line on the outer side of the ankle portion of the leg and foot of the subject person;

FIG. 3 is a view in elevation depicting the manner of delineating a line on the instep of a foot of the subject person for locating the slit defining the opening of a shoe;

FIG. 4 is a plan view showing the manner of making a foot imprint on a thin sheet of pliable leather preparatory to fabricating a mold of the foot;

FIG. 5 is a plan view showing the foot imprint cut out of the leather sheet shown in FIG. 4 and depicting the cut-out or sole as adhered to a sheet of monk's cloth preparatory to application of the cloth to the foot of the subject person to thereby form a mold of the foot;

FIG. 6 is a perspective view of the foot and ankle of the subject person showing the manner of applying lineal embossments to the back, side and instep of foot shown in FIGS. 1, 2 and 3, to define the delineations thereon;

FIG. 7 is an isometric sectional view of a fragmentary portion of the embossment as detached and as seen on the line 7—7 of FIG. 6;

FIG. 8 is a perspective view showing a foot as positioned on the sole cut-out applied to the sheet of monk's cloth assembly preparatory to covering the foot with the cloth;

FIG. 9 is a view similar to FIG. 8, illustrating the manner of initially applying portions of the cloth sheet to the foot on opposite sides of the embossments on the back and side portions of the foot;

FIG. 10 is an enlarged detail in cross section as seen on the line 10—10 of FIG. 9;

FIG. 11 is a perspective view depicting the foot with the applied sole cut-out as encased in the sheet of monk's cloth;

FIG. 12 is an enlarged plan view of the foot structure shown in FIG. 11;

FIG. 13 is an enlarged exploded detail in cross section taken on the line 13—13 of FIG. 11 illustrating a partly demountable fabric strip overlying the instep portion of the foot wrapping;

FIG. 14 is a perspective view of the fabric wrapped foot as seen from the underside thereof, showing the sole of the wrapping as coated with a layer of gypsum;

FIGS. 15 and 16 are views in side and rear elevation respectively showing the wrapped foot with the gypsum undercoat as positioned upright on a level surface preliminary to fabricating a plaster mold;

FIG. 17 is a view in side elevation of the wrapped foot as shown in FIGS. 15–16 showing the lower portion of the foot as encased in a plaster mold section:

FIG. 18 is a plan view of the assemblage shown in FIG. 17 depicting the upper rear portion of one side of the foot as encased in a mold section;

FIG. 19 is a view similar to FIG. 18 showing the upper rear portion of the other side of the foot as encased in a mold section;

FIG. 20 is a plan view of the assemblage shown in FIG. 19 with the upper forward portion of the foot as encased in a mold section: the view being a plan view of the complete mold encompassing the wrapped foot;

FIG. 21 is a perspective view of the mold encompassed foot shown in FIG. 20;

FIG. 22 is a view in perspective depicting a portion of the several elements of the mold section of FIG. 21 as separated from the wrapped foot;

FIG. 23 is a frontal perspective view of the wrapped foot depicting the partly detachable strip covering a slit in the vamp portion of the wrapping;

FIG. 24 is a detail in cross section as seen on the line 24—24 of FIG. 23 showing the vamp slit as partly spread apart preliminary to effecting removal of the wrapping from the foot;

FIG. 25 is a perspective view of the wrapping of FIG. 23 as conditioned to form a mold;

FIG. 26 is an enlarged section taken on the line 26—26 of FIG. 25;

FIG. 27 is a perspective view of a plaster cast formed in the mold of FIG. 25;

FIG. 28 is a perspective view of the cast of FIG. 27 showing it as revamped preparatory to fabricating a permanent last-mold thereon;

FIG. 29 is a perspective view showing the cast of FIG. 28 as wrapped with latex coated felt which in turn is coated with epoxy and cured;

FIG. 30 is a perspective view of the wrapping removed from the cast of FIG. 29 as conditioned to form a permanent last mold;

FIG. 31 is a perspective view of a finished cast made from the last mold of FIG. 30 showing it as bearing grooves delineating the balance lines and vamp slit line marked on the subject person's foot as shown in FIGS. 1–3;

FIG. 32 is a perspective view showing the cast of FIG. 31 as covered with a thin sheet of leather;

FIG. 33 is a perspective view depicting the leather covered last of FIG. 32 as covered on the underside thereof with a paste mixture of ground cork and latex;

FIGS. 34 and 35 are views in rear and side elevations respectively of the last of FIGS. 32–33 depicting the manner of balancing the last preparatory to fabricating a shoe thereon.

In carrying out the invention a straight line A is initially marked on the back of each leg $a$—$a$ of the subject person, which lines lead upwardly from the heels $b$—$b$ toward the base $c$ of the spine for which purpose the person is positioned face downward on a table with the legs close together, with the feet $d$—$d$ extruded and with the soles $e$—$e$ presented upward. A straight edge is positioned on the back of a leg to extend between the base $c$ of the spine and a point $f$ opposite the fifth metatarsal, and the mark A delineated on the back of the leg $a$ along the straight edge over the back of the heel $b$ upward a short distance on the leg as indicated in full lines in FIG. 1.

A straight line B is then marked on the outer side of each foot $d$ leading from the sole $e$ toward the pivotal center $g$ of the knee $h$, as shown in FIG. 2. For this purpose, the subject is seated with the forward portion of the foot resting on the floor $h'$ and with the heel slightly lifted to a comfortable heel height. The line B is delineated at a ninety degree angle relative to the floor on which the foot is supported.

A straight line C is then marked lengthwise of the instep $i$ and a short distance upward on the front of the leg, which line leads from the forward end of the foot between the first and second metatarsals $j$ to the center $k$ of the knee cap as indicated in FIG. 3.

The lines A and B are subsequently reproduced in a cast last and then serve as balancing guides when fabricating a shoe on the last. When so utilized the line A determines the right to left plane the last should be balanced. This is accomplished by positioning the last with the reproduced line A at right angles or perpendicular to the floor as will be later described. In like manner the line B on the last determines the balanced position of the last forward and back and is effected by disposing the last with the line B at right angles or perpendicular to the floor. The reproduced line C on the last determines the location on the vamp of the shoe where the lace opening of the shoe is to be formed. At this point, a measurement may be taken of the length of the lines A from the point $c$ to the heel $b$ to determine, if need be, whether one leg is shorter than the other.

The next step is to produce leather insoles substantially in conformity with the soles $e$—$e$ of the feet $d$—$d$ which is effected as shown in FIG. 4 by making imprints of the soles $e$—$e$ on a sheet D of semi-soft flexible leather, such imprints being made by pressing each foot $d$ downwardly on the leather sheet D spread flat on the floor with the lines A–B on the feet and legs extending perpendicular to the surface of the floor; the soles of the feet being previously coated with any suitable material to print the areas of contact of the soles on the leather sheet D.

Before removing a foot from a sheet D, the locations of the lower ends of the lines A–B and the outer end of the line C are marked on the sheet D as indicated at $a'$–$b'$ and $c'$ in FIGS. 4 and 5.

Since the sole of the foot does not always rest entirely on the ground, the imprint made on the sheet D may comprise that of the heel $b$, the ball of the foot spaced from the heel, and the underside of the toes. Be as it may, on removal of a foot the margins of the heel print and the side margins of the ball print are delineated on the sheet D and the forward end of the toe outline is extended on a return bend $l$ forward of the front end of the foot to define a toe clearance space $l'$.

The delineated side margins of the heel and ball imprints are joined and the marks $a'$–$b'$–$c'$ are extended to cross the delineation as shown in FIG. 5 whereupon the sheet D is severed along the line $l$ and the outline of the imprint defining the sides and heel portions of the foot, thereby producing an insole E as indicated in FIG. 5. A line F is drawn longitudinally of the insole leading between the marks $a'$–$c'$ indicating the lower ends of the lines A–C, and a line G is drawn transversely of the insole at right angles to line F at the forward margin of the heel print where the inner end of the arch of the foot meets the heel print, as shown in FIG. 5. The lines F–G are then scribed into the upper face of the insole E for subsequent reproduction in a cast, as will be later described.

The line G constitutes a reference mark and is subsequently reproduced on a finished last to indicate where the foremost part of the heel of a shoe should be located. The line F serves with the marks $a'$–$b'$–$c'$ to facilitate relocation of the insole when repositioning it on the foot in producing a mold of the foot. This is initiated by affixing the insole E apart from the foot by a suitable adhesive to approximately the center of a sheet H of monk's cloth or other suitable material, as shown in FIG. 5; the sheet H being previously coated and impregnated with a latex rubber mold compound and cured, and being of ample size to encompass the foot and ankle when applied thereto, as will presently be described.

The next step consists in applying to each of the feet $d$—$d$ a series of lengths of cords $m$, $n$ and $p$ arranged to longitudinally overlie the lines A–B–C, respectively, as shown in FIG. 6; the cords being removably attached to the feet by strips of adhesive tape $r$ which extend lengthwise of the cords with the margins of the tape projecting from opposite sides of the cord as shown in FIG. 7. The cords $m$–$n$ serve to form channels in the interior of the molds subsequently formed of the feet whereby the lines A–B will be reproduced on the casts formed by the molds.

The cords $p$ in overlying the lines C on the insteps of the feet form channels within the molds and ridges on the casts, defining the location of the frontal or lace openings of shoes as will presently be described.

The next step is to position the inner soles E on the soles of the feet $d$—$d$, as shown in FIG. 8 with each inner sole in conformity with the foot from which it was patterned; the proper relative position and location of the inner sole on the sole of the foot being determined by registering the lower ends of the lines A–B–C with their corresponding marks $a'$–$b'$–$c'$ on the margin of the sole. A piece $s$ of sponge or other suitable material is placed on the projecting portion $l'$ of the inner sole to provide a rough toe cap ahead of the toes in the forthcoming mold.

The marginal portions of the cloth H are then folded upward around the margin of the inner sole E and wrapped around the foot and ankle as indicated in FIGS. 10–13 to produce a mold of the foot incorporating the inner sole E; the cloth being slit at suitable intervals inwardly from the margin thereof to the margin of the inner sole as occasion may require to facilitate conformation of the cloth H to the contours of the foot and ankle. While such slits may vary in location and arrangement according to requirements, they essentially embody slits $t$–$u$ and $v$ leading outwardly from the margin of the inner sole from the markings thereon at the lower ends of the lines A and B as indicated in FIG. 8.

Before wrapping the sheet H around a foot $d$ strips $m'$—$m'$ of monk's cloth about one-half inch in width, are positioned lengthwise on opposite sides of the cord $m$, and corresponding strips $n'$—$n'$ are disposed longitudinally on opposite sides of the cord $n$; the strips $m'$—$m'$ and $n'$—$n'$ being arranged in parallel edgewise abutting relation to the cords $m$–$n$ and detachably held in place by strips of adhesive tape.

In then wrapping the foot in the sheet H the latter is extended over the strip $m'$—$m'$ and $n'$—$n'$ as shown in FIG. 10 and permanently adhered thereto; the sheet H thus spanning the gaps between the strips $m'$—$m'$ and $n'$—$n'$ and loosely overlying the cords $m$–$n$ therein and thereby forming the interior of the wrapping H with channels A' and B' extending opposite the lines A–B delineated on the foot $d$ as shown in FIG. 10.

The cloth sheet H is then inturned on its forward side portions to overlie the instep and frontal portion of the foot and has the opposed margins of such side portions trimmed so as to abut the opposite sides of the cord $p$. A strip $x$ of the monk's cloth is then positioned longitudinally over the cord $p$ throughout the length thereof and is adhered along its margins to the portions of the sheet H extending adjacent the opposite sides of the cord $p$ as shown in FIGS. 12 and 13. The strip $x$ is permanently glued to the sheet H along one margin of the strip that is on one side of the cord $p$, and is glued to the sheet H along the other margin of the strip at the other side of the cord $p$ by a non-drying adhesive whereby one margin of the strip $x$ may be pulled free of the foot wrapping to open the vamp portion thereof and permit withdrawal of the foot from the mold wrapping, as will be later described. The strip $x$ in spanning the gap between the margins of the wrapping H on opposite sides of the cord $p$, form with such margins a channel C' extending opposite the line C delineated on the instep of the foot $d$.

In conforming the monk's cloth wrapping to a foot and ankle, variously arranged cuts and slits are made in the cloth as before stated according to requirements to meet variance in foot shapes and as determined by the craftsman to obtain the best wrap in positioning it over the entire foot and ankle. During all phases of the wrapping operations, attention is given to obtaining firm but comfortable pressures on the foot so that when the cloth H and inner sole E are completely assembled on the foot the subject person will have the feeling of a snug but comfortable shoe on the foot.

On completion of the wrapping as shown in FIGS. 11 and 12 which overlies the cords $m$ and $n$ as indicated in FIG. 10 the lines A–B are defined on the wrapping by making marks A''–B'' thereon opposite the channel A'–B' and cords $m–n$, as indicated in FIGS. 16 and 15 respectively. The underside of the wrapped foot is then coated with a layer J of slow hardening gypsum as shown in FIG. 14.

The sheathed foot is then positioned on a floor or flat level surface $y$ with the heel held at proper elevation as by a shim K and with a wedge K' placed under the toe for the maximum comfortable rise permissible; the foot being positioned with the line B'' extending at right angles to the surface $y$ as shown in FIG. 15 and with the line A'' projecting at right angles to the surface $y$ as shown in FIG. 16.

The underside of the sheathed foot when positioned as shown in FIGS. 15–16, as well as the toe, sides and heel portions up to the ankle of the foot, are covered with a body L of fast hardening gypsum as indicated in FIG. 17 which body is allowed to harden, thereby anchoring the sheathed foot in a normal balanced position determined by the vertical lines A''–B'' and their associated lines A–B on the feet of the subject person.

The top edge of the hardened body L of gypsum is then coated with a lubricant whereupon the upper portion of the cloth covering of the foot is enclosed in a removable plaster casing here shown as comprising section M, N and P of which the sections M–N lead from opposite sides of the line A'' to midway of the ankle, as shown in FIGS. 18–19 and the section P overlies the entire vamp or instep portion of the foot as shown in FIG. 20. The sections M–N–P seat on the upper margin of the base body L and abut each other on their contiguous margins as shown in FIG. 21. Such abutting margins are lubricated to permit ready separation of the sections which is effected promptly on hardening thereof. FIG. 22 depicts the sections M–N–P as separated from each other and from the base section L which remains in place.

On the plaster sheath being thus removed, thereby exposing the upper portion of the wrapped foot one margin of the strip $x$ is pulled clear of the wrapping as shown in FIG. 24 so as to free the margins of the wrapping H on opposite sides of the cord $p$ as indicated, whereupon the foot $d$ is withdrawn from the encompassing cloth sheath. The wrapping is then reassembled by reuniting the separated margins of the wrapping and restoring such margins to their normal relatively spaced position by re-adhering the detached margin of the strip $x$ to the wrapping as shown in FIGS. 25–26; the strip $x$ and said margins reestablishing the channel C'.

The result at this point is a mold Q of the foot $d$, which mold is characterized by possessing internal channels $A^3$–$B^3$ and C' on its side wall as shown in FIG. 26, which channels were initially defined by the cords $m$–$n$ and $p$ and conform to the lines A–B–C delineated on the subject's foot $d$. The mold Q embodies the insole E, the upper face of which bears the lines F and G which, being scribed, are defined by shallow channels.

The interior surface of the mold Q is then coated with a suitable lubricant and a plaster cast R, shown in FIG. 27, is formed by pouring suitable plaster in the mold Q and allowing it to harden, after which the mold Q is stripped from the cast R and dispensed with.

The cast R comprises an accurate model of the foot of the subject person and includes ribs $A^4$–$B^4$ and $C^2$ on its sides, conforming to the balance lines A–B and vamp line C, and also bearing ribs F'–G' on its underside conforming to the lines F–G. To condition the case R for use in the production of a permanent finished last, the ribs $A^4$, $B^4$, $C^2$, F' and G' are removed and ribs $A^4$, $B^4$, $C^2$ and G' replaced by shallow grooves $A^5$, $B^5$, $C^3$ and $G^2$ as shown in FIG. 28, rib F' being eliminated, having served its purpose. To provide for toe clearance and shape of the toe cap of a shoe to be fabricated on the last, the toe portiton of the case R is built up with a body $z$ of plaster and shaped to the desired contour, as indicated in dotted lines in FIG. 28.

The cast R is then tightly wrapped in a fresh latex coated sheet felt S and completely covered thereby as shown in FIG. 29; the latex coating being thick enough to fill the grooves $A^5$, $B^5$, $C^3$ and $G^2$. On curing of the latex coating, the felt wrapping S is coated with epoxy upon the curing of which the wrapping S and cast R are separated which operation is effected by forming a slit T in the wrapping S along one side of the groove $C^3$ as shown in FIG. 29. The wrapping S is then opened along the slit T and withdrawn from the cast R. A mold U is thus produced comprising an epoxy coated latex impregnated felt shell, as shown in FIG. 30; the slit T being sealed by a strip V of non-drying adhesive tape. The mold U will bear internal ribs $A^6$, $B^6$, $C^4$ and $G^3$ complementary to the grooves $A^5$, $B^5$, $C^3$ and $G^2$ of the cast R, and constitutes a finished last-mold from which a permanent last W, shown in FIG. 31, is molded. The mold U of the required dimensions and contours of the inside of a shoe, may be used repeatedly.

The last W is produced by pouring a suitable wet plaster in the mold U previously lubricated internally; the plaster being allowed to set therein, whereupon the strip V is stripped from the mold U and the sides of the latter spread apart whereupon the cast last W is withdrawn from the mold. The last W will not only constitute a replica of a foot of the subject person, but, as shown in FIG. 31 will bear shallow grooves $A^5$, $B^7$, $C^5$, complementary to the lines A, B, C, initially delineated on the subject's foot together with a groove line $G^4$ corresponding to the line G on sole E.

The next step shown in FIG. 32 consists in sheathing the last W with a sheet X of thin leather, snugly fitted to the last with all excess pieces trimmed off; the sheet X being secured in place as by means of adhesive tape. Lines $A^8$, $B^8$, $C^6$ and $G^5$ are marked on the leather sheathing conforming to the grooves $A^7$, $B^7$, $C^5$, and $G^4$ of the last W as shown in FIG. 32.

A layer Y of paste mixture composed of ground cork and latex is placed on the underside of the leather covered last, as indicated in FIG. 33 whereupon the last is seated with the layer Y on the underside thereof in an upright position on a horizontal flat surface $y'$ as shown in FIGS. 34–35. The last is then disposed in a balanced position, that is with the line $A^8$–$B^8$ extending perpendicularly at right angles to the horizontal surface $y'$ which is effected by the aid of a square Z or other suitable tool, as shown in FIGS. 34–35.

In thus positioning the last, the paste mixture forming the layer Y is added to or removed from the underside of the last as need be to tilt the last as may be required to dispose the lines $A^8$–$B^8$ in alignment with the upstanding leg of the square X while the other leg thereof is seated on the surface $y'$.

When the proper balance is obtained, that is with the right-to-left plane established by the line $A^8$ at right angles to the surface $y'$ and the forward and backward plane established by the line $B^8$ at right angles to the surface $y'$ excess portions of the paste protruding from the last is trimmed away. The last is then allowed to stand until the latex paste layer Y hardens whereupon the last is in readiness for the fabrication of a shoe thereon. The leather sheath X and the layer Y will then constitute the lining and inner sole of the shoe fabricated thereover in a usual manner.

Should there be need for special support or correction to the foot, requiring the use of a re-inforcement, such may be imbedded in the paste layer Y before the balancing operation is performed.

In fabricating the shoe, the line $G^5$ indicated on the sheath X will denote the location of the forward margin of the shoe heel.

I claim:
1. The method of producing a last for custom-made shoes, consisting in:
    (a) initially defining a straight line on the back of a leg of a person to be fitted with a shoe, said line extending on the leg from the center of the heel toward the base of the spine;
    (b) defining a straight line on the sides of said leg leading at right angles to the level surface on which the foot of the leg is seated with heel clearance to the center of the knee joint thereabove;
    (c) making an imprint of the foot on a pliable sheet of leather;
    (d) defining toe clearance on said sheet and trimming said sheet along the margin of the foot-print and the defined toe clearance thereon thereby forming an inner sole;
    (e) adhering said inner sole to a wrapping sheet of latex coated cloth;
    (f) affixing lineal embossments over the lines defined on the sides and back of the foot and leg;
    (g) imposing the foot on said inner sole then wrapping the foot and embossments thereon in said sheet of latex covered cloth;
    (h) seating the wrapped foot on a pad of soft plaster on a level surface with the embossed lines on the back and sides of the foot extending at right angles to said surface and allowing the plaster pad to set;
    (i) forming a sectional mold of the wrapped foot including said plaster pad and embossments;
    (j) removing and re-assembling said mold apart from the foot and forming a preliminary last therefrom bearing reproductions of said embossments;
    (k) converting the reproductions of said embossments on said preliminary last into grooves;
    (l) covering the preliminary last with a layer of latex coated felt impressed into said grooves;
    (m) coating said felt covering with epoxy and allowing said coating to set and removing said epoxy coated felt from said preliminary last; and
    (n) molding a finished last from the mold formed by said epoxy coated felt with said last bearing grooves formed by said epoxy coated felt mold corresponding to the lines delineated on the subject person's foot.
2. The method recited in claim 1 together with the following steps:
    (a) delineating a straight line on the instep of the foot leading from opposite the fifth metatarsal toward the center of the knee cap;
    (b) affixing a lineal embossment over said line;
    (c) dividing the cloth wrapping to terminate along opposite sides of said instep embossment;
    (d) imposing a strip of sheet material over said embossment with one margin thereof permanently adhered to one adjacent margin of said sheet wrapping and adhering the other margin of said strip to the other margin of the sheet wrapping with a separable non-drying adhesive;
    (e) whereby said instep embossment will define a channel in the interior of the cloth mold corresponding to the line on the subject person's instep for subsequent reproduction on the preliminary last, felt mold and finished last to indicate on the latter the location of the shoe opening.
3. The method recited in claim 1 together with the following steps:
    (a) scribing a line longitudinally of said insole leading from opposite the second metatarsal to the center of the back margin of the heel print;
    (b) scribing a line on said insole at right angles to said line at the forward margin of said heel print;
    (c) forming said scribed lines such that they will mold ribs on the bottom of said preliminary last;
    (d) eliminating the longitudinal rib on converting the right angled rib into a channel so as to be reproduced as a rib in the last mold produced from said preliminary mold.

References Cited by the Examiner

UNITED STATES PATENTS

| 2,589,241 | 3/1952 | Galhouse et al. | 12—146 |
| 2,668,304 | 2/1954 | Murray | 12—142 |
| 2,699,562 | 1/1955 | Murray | 12—146 |
| 2,973,529 | 3/1961 | Silverman | 12—142 |

FRANK J. COHEN, *Primary Examiner.*